US012045039B2

(12) United States Patent
Lutz et al.

(10) Patent No.: US 12,045,039 B2
(45) Date of Patent: Jul. 23, 2024

(54) ELECTRONIC HOUSEHOLD APPLIANCE HAVING A CONTROL SYSTEM WITH A SUB-CONTROLLER CONFIGURED FOR DATA COMMUNICATION WITH AN EXTERNAL ADMINISTRATIVE UNIT

(71) Applicant: DIEHL AKO STIFTUNG & CO. KG, Wangen (DE)

(72) Inventors: Bernhard Lutz, Wangen (DE); Andreas Ruess, Wangen (DE)

(73) Assignee: Diehl AKO Stiftung & Co. KG, Wangen (DE)

(*) Notice: Subject to any disclaimer, the term of this patent is extended or adjusted under 35 U.S.C. 154(b) by 0 days.

(21) Appl. No.: 17/348,859

(22) Filed: Jun. 16, 2021

(65) Prior Publication Data

US 2021/0311462 A1    Oct. 7, 2021

Related U.S. Application Data

(63) Continuation of application No. PCT/EP2019/083029, filed on Nov. 29, 2019.

(30) Foreign Application Priority Data

Dec. 18, 2018 (DE) .................. 10 2018 009 944.0

(51) Int. Cl.
*G05B 19/41* (2006.01)
*G05B 19/042* (2006.01)
*G05B 19/418* (2006.01)

(52) U.S. Cl.
CPC ....... *G05B 19/4185* (2013.01); *G05B 19/042* (2013.01); *G05B 2219/25168* (2013.01); *G05B 2219/2613* (2013.01)

(58) Field of Classification Search
CPC .............. G05B 19/4185; G05B 19/042; G05B 2219/25168; G05B 2219/2613; G05B 19/0421; H04L 12/2825
See application file for complete search history.

(56) References Cited

U.S. PATENT DOCUMENTS

| 2009/0157890 A1* | 6/2009 | Lanz ..................... H04L 65/40 |
| | | 709/231 |
| 2014/0167928 A1* | 6/2014 | Burd .................. H04L 12/2809 |
| | | 340/12.5 |

(Continued)

FOREIGN PATENT DOCUMENTS

| DE | 102011017631 A1 | 10/2012 |
| DE | 102011077572 A1 | 12/2012 |

(Continued)

*Primary Examiner* — Christopher W Carter
(74) *Attorney, Agent, or Firm* — Laurence A. Greenberg; Werner H. Stemer; Ralph E. Locher

(57) ABSTRACT

An electronic household appliance has a control system which has a plurality of internal control units and a communication network between the plurality of internal control units. A selected internal control unit of the plurality of internal control units contains a controller and is additionally provided with a communication device which is configured for data communication with at least one external administrative unit without intermediate storage of the data to be communicated. The controller of the selected internal control unit is also configured to control data communication between the at least one external administrative unit and the plurality of internal control units of the control system via the communication device.

11 Claims, 3 Drawing Sheets

(56) References Cited

U.S. PATENT DOCUMENTS

| | | | |
|---|---|---|---|
| 2017/0279632 A1* | 9/2017 | Kober | G06F 3/0484 |
| 2021/0271215 A1* | 9/2021 | Ju | H04L 12/2816 |

FOREIGN PATENT DOCUMENTS

| | | | | |
|---|---|---|---|---|
| DE | 102011087777 A1 * | 6/2013 | | F25D 29/005 |
| DE | 102011087777 A1 | 6/2013 | | |
| DE | 102016223950 A1 * | 6/2018 | | H04L 67/12 |
| DE | 102016223950 A1 | 6/2018 | | |
| EP | 2247067 A1 | 11/2010 | | |
| EP | 2704007 B1 | 7/2015 | | |

\* cited by examiner

ELECTRONIC HOUSEHOLD APPLIANCE HAVING A CONTROL SYSTEM WITH A SUB-CONTROLLER CONFIGURED FOR DATA COMMUNICATION WITH AN EXTERNAL ADMINISTRATIVE UNIT

The present invention relates to an electronic household appliance having a control system which has a plurality of internal control units and a communication network between the plurality of internal control units.

Electronic household appliances are being networked more and more frequently to other household appliances, an intelligent home controller or the Internet. This networking makes it possible to transmit software updates to the control units of the household appliances or to externally provide usage data from the household appliances, for example.

EP 2 704 007 B1 discloses a household appliance having a plurality of control units which can be updated and are connected via an internal bus, wherein the household appliance is additionally equipped, for the purpose of securely updating the firmware of the control units, with an intelligent communication module which has a non-volatile memory for buffering program update data and can retrieve the program update data from an external communication partner outside the household appliance.

The object of the invention is to provide an electronic household appliance having an improved control system with a simple structure.

This object is achieved by means of an electronic household appliance having the features of claim 1. The dependent claims relate to particularly advantageous configurations and developments of the invention.

The electronic household appliance of the invention contains a control system which has a plurality of internal control units and a communication network between the plurality of internal control units. According to the invention, it is proposed to additionally provide a selected internal control unit of the plurality of internal control units, which contains a controller, with a communication device which is configured for data communication with at least one external administrative unit without buffering the data to be communicated. The controller of the selected internal control unit is also configured, according to the invention, to control data communication between the at least one external administrative unit and the plurality of internal control units of the control system via the communication device.

Since the additional communication device need not buffer the data to be communicated and the data communication between the at least one external administrative unit and the plurality of internal control units of the control system is controlled via this communication device by the controller of the selected internal control unit, it is possible to use a simple and cost-effective communication device which can be integrated in or connected to an existing internal control unit of the household appliance. The communication device used according to the invention is not, in particular, an independent communication module having its own non-volatile memory and its own data communication controller. Instead, the computing capacities which are available anyway and possibly also storage capacities of the selected internal control unit are used. Non-volatile buffering of the data to be communicated in the communication device is neither possible nor intended according to the invention.

In this context, the terms "internal" and "external" relate to the household appliance. That is to say, the plurality of internal control units are parts of the control system in or on the household appliance, whereas the external administrative units are separate components outside the control system and outside the household appliance.

The data to be communicated via the communication device include, in particular, control program data and firmware updates for the internal control units and usage data from the internal control units. In this context, it is also possible to set up tunnels to the internal control units. Data streaming to or from internal control units is also conceivable if, for example, camera modules or video displays are provided on the household appliance.

The external administrative units include, in particular, the Internet, cloud servers, central home controllers, service computers, smartphones, memory cards, memory sticks and the like. Depending on their embodiment, the external administrative units may communicate with the communication device in a wireless or wired manner or can be directly connected to the communication device.

The communication network between the plurality of internal control units of the control system may have any desired configuration, in principle. It preferably contains a bus system, a daisy chain, a plurality of individual communication connections in a star structure, a plurality of communication connections in a tree structure or combinations of the above-mentioned possibilities. The communication network may also be entirely or partially wired or wireless.

The controller of the selected internal control unit is a CPU or a microcontroller, for example. The selected internal control unit preferably also has a memory, preferably a non-volatile memory, which is connected to the controller. The other internal control units of the control system preferably, but need not necessarily, each likewise have a controller and possibly also a memory.

The electronic household appliance is, for example, a hob, a cooker, an extractor hood, a dishwasher, a laundry treatment appliance (for example washing machine, tumble dryer), a refrigeration appliance (for example fridge, freezer), an air-conditioning appliance or the like. The internal control units of such an electronic household appliance are used, for example, to control the various units of the household appliance, for example pumps, heating systems, cooling apparatuses, fans, etc., or are used as an operating apparatus or as a central controller of the household appliance.

In one configuration of the invention, the communication device has a communication module having at least one module interface for data communication with the at least one external administrative unit and a connection interface for data communication with the controller of the selected internal control unit. This communication module preferably has at least one module interface for the wired (e.g. Ethernet) or wireless communication connection to an external administrative unit (e.g. by radio, Bluetooth, etc.) and/or at least one module interface for the direct connection to an external administrative unit (e.g. USB, memory card slot, etc.).

Alternatively or additionally, the communication device may have at least one control interface for directly connecting the controller of the selected internal control unit to an external administrative unit.

An operating apparatus having an input device and/or a display device for a user of the household appliance is preferably selected for the selected internal control unit. The control unit having the greatest computing power is preferably selected.

In this case, the controller of the selected internal control unit is configured to control the input device and/or the display device for exchanging information relating to data communication via the communication device. The exchange of information preferably comprises displaying information relating to possible data communication (e.g. available software updates) and current data communication (e.g. status of the current data communication) to a user of the household appliance via the display device and/or inputting control commands relating to data communication (e.g. start available software updates, request available software updates, etc.) by a user of the household appliance via the display device.

The communication module can preferably contain a CPU and a non-volatile memory for internally controlling communication. The CPU and non-volatile memory are not used by the communication device to store the data from an external communication unit.

The above and further features and advantages of the invention become better comprehensible from the following description of preferred, non-restrictive exemplary embodiments on the basis of the accompanying drawing, in which, largely schematically:

FIG. 1 shows a first embodiment of a control system according to the invention for an electronic household appliance.

Figure 1:
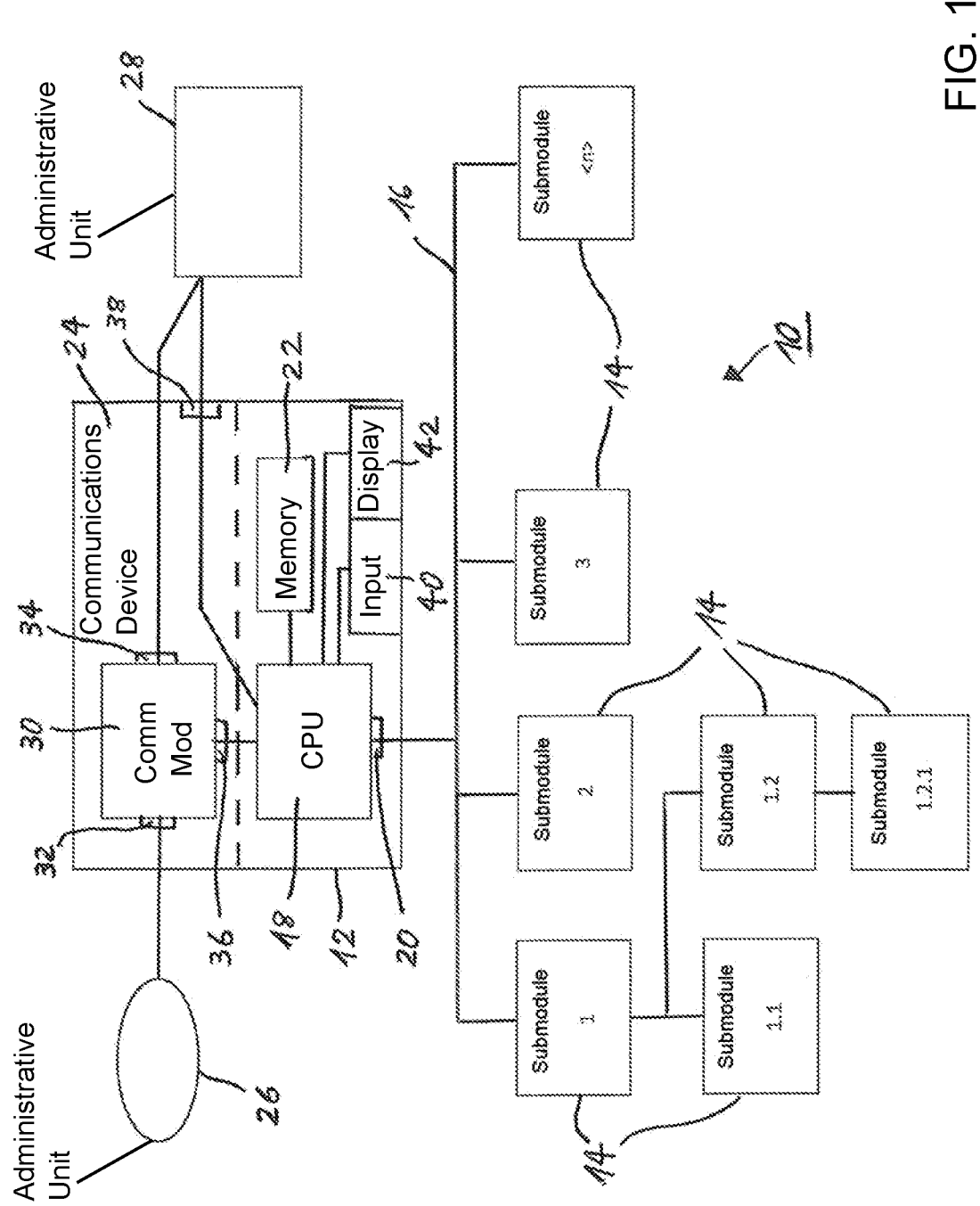
FIG. 1 shows the structure of a control system for a household appliance according to a first exemplary embodiment of the invention.

The control system 10 contains a plurality of internal control units 12, 14, one of which is used as a selected internal control unit 12, and the other internal control units are connected as submodules to this selected internal control unit 12 via a communication network 16. In the embodiment of FIG. 1, the communication network 16 is a bus system and some of the submodules 14 are connected in the form of a tree structure. The bus system 16 may be wired or wireless or may be partially wired and partially wireless.

The selected internal control unit 12 contains, for example, a CPU as a controller 18 and a non-volatile memory 22 connected to this controller 18. The controller 18 has a network interface 20 for connection to the bus system 16.

The selected internal control unit 12 is, for example, an operating apparatus of the household appliance that is equipped with an input device 40 and a display device 42. The input device 40 and the display device 42 are connected to the controller 18.

As illustrated in FIG. 1, the selected internal control unit 12 is also equipped with a communication device 24. The communication device 24 is preferably integrated in or connected to the control unit 12. The internal control units 12, 14 of the control system 10 can carry out data communication with external administrative units 26, 28 via this communication device 24 in order to receive software updates or to provide usage data, for example.

For this purpose, the communication device 24 has a simple communication module 30 which has a module interface 32 for the wireless communication connection to an external administrative unit 26 (e.g. Internet, cloud, laptop with Bluetooth, etc.), a module interface 34 (e.g. USB connection, memory card slot, etc.) for the direct connection to an external administrative unit 28 (e.g. USB stick, SD memory card, laptop with USB cable, etc.) and a connection interface 36 (e.g. SDIO, SPI, I2C, UART, etc.) for connection to the controller 18. The communication device 24 illustrated in FIG. 1 also has a control interface 38 (e.g. USB connection, memory card slot, etc.) for directly connecting the controller 18 to an external administrative unit 28 (e.g. USB stick, SD memory card, laptop with USB cable, etc.). In other embodiment variants of the invention, only some of these components 24, 38 of the communication device 24 or only some of the module interfaces 32, 34 of the communication module 24 are present.

The data communication between the internal control units 12, 14 and the external administrative units 26, 28 is controlled by the controller 18 of the selected internal control unit 12. The data to be communicated are not buffered in a non-volatile manner inside the communication device 24 or in the memory 22 of the control unit 12. In the event of a power interruption during data communication via the communication device 24, the data communication must be newly carried out. If there is sufficient storage space, however, the data to be communicated can possibly also be completely or partially buffered in a volatile manner in the memory 22 of the control unit 12.

Figure 2:
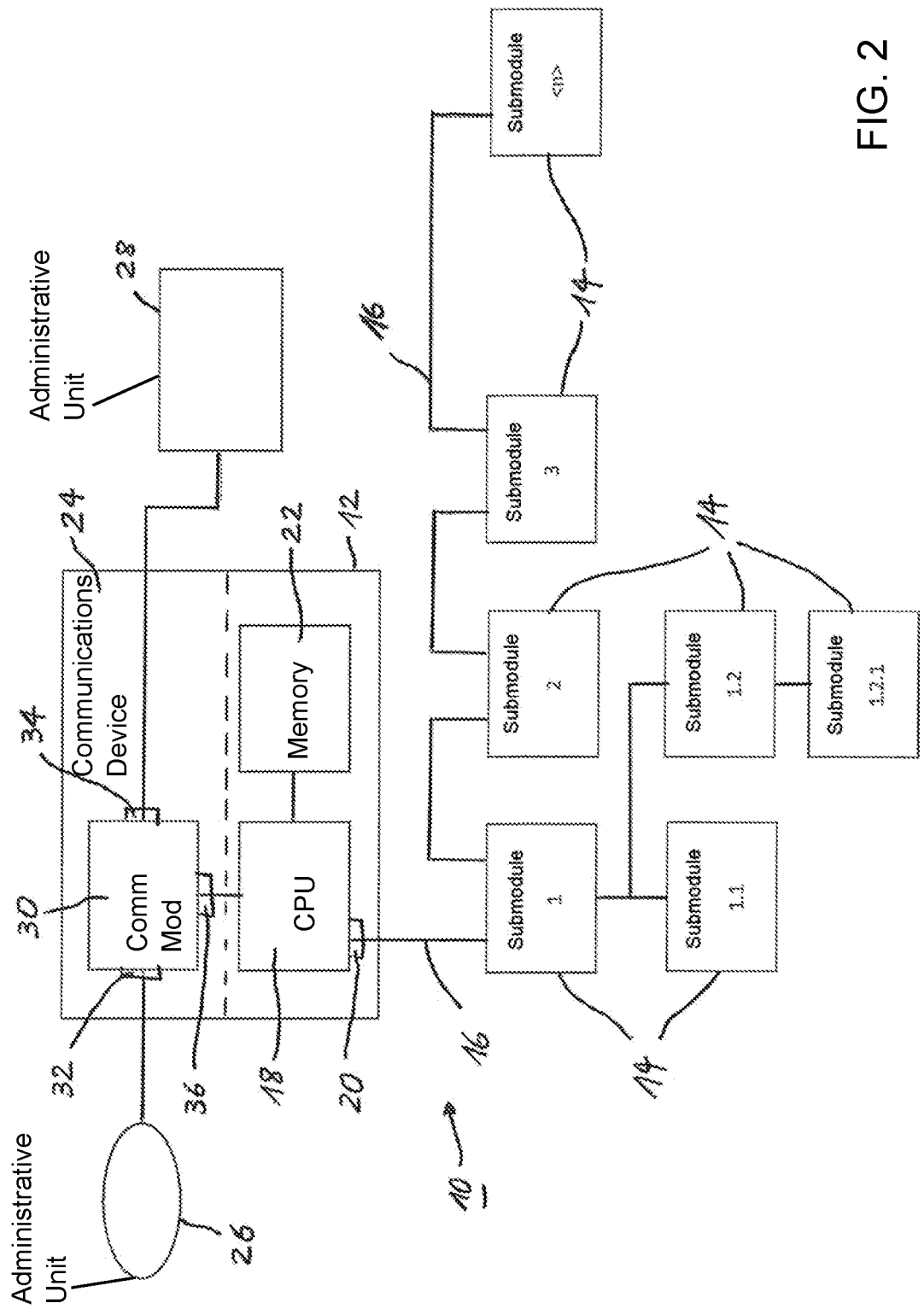
FIG. 2 shows the structure of a control system for a household appliance according to a second exemplary embodiment of the invention.

FIG. 2 shows a second embodiment of a control system according to the invention for an electronic household appliance.

The control system 10 of FIG. 2 differs from the first embodiment of FIG. 1 only in the configuration of the communication network 16. In the embodiment of FIG. 2, the communication network 16 is in the form of a daisy chain.

For the rest, the control system of FIG. 2 corresponds to that of the first embodiment, in which case some components of the selected internal control unit 12 have been omitted in FIG. 2 for the sake of simplicity.

Figure 3:
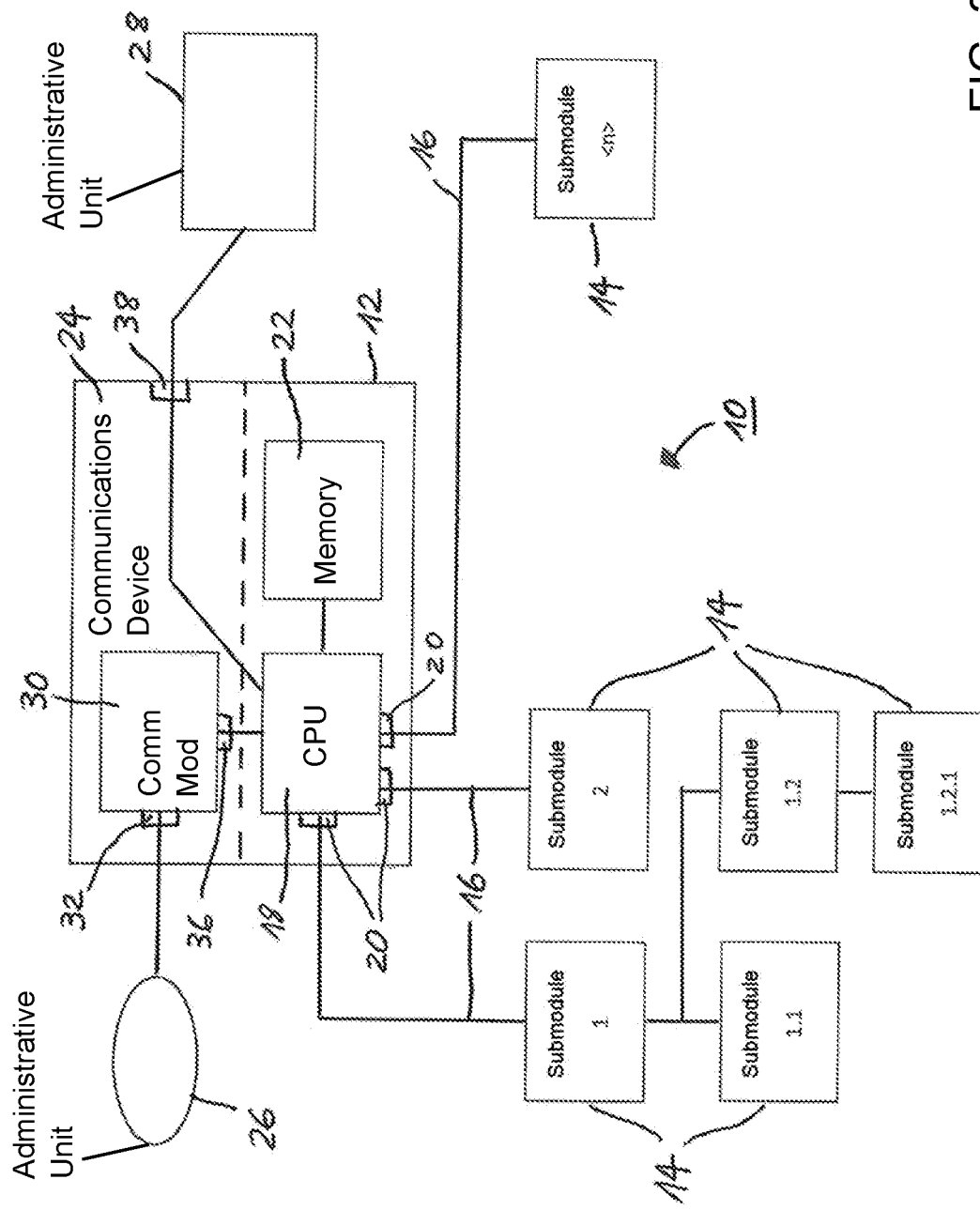
FIG. 3 shows the structure of a control system for a household appliance according to a third exemplary embodiment of the invention.

FIG. 3 shows a third embodiment of a control system according to the invention for an electronic household appliance.

The control system 10 of FIG. 3 likewise differs from the first embodiment of FIG. 1 only in the configuration of the communication network 16. In the embodiment of FIG. 3, the communication network 16 is in the form of a star.

For the rest, the control system of FIG. 3 corresponds to that of the first embodiment, in which case some components of the selected internal control unit 12 have been omitted in FIG. 3 for the sake of simplicity.

LIST OF REFERENCE NUMERALS

10 Control system
12 Selected internal control unit
14 Internal control units
16 Communication network
18 Controller of 12
20 Network interface
22 Memory of 12
24 Communication device
26 External administrative unit (wirelessly connected)
28 External administrative unit (directly connected)
30 Communication module
32 Module interface for the wireless communication connection
34 Module interface for the direct connection
36 Connection interface
38 Control interface for the direct connection
40 Input device of 12
42 Display device of 12

The invention claimed is:

1. An electronic household appliance, comprising:
a control system having a plurality of internal controller systems and a communication network connected between said plurality of internal controller systems;
said plurality of internal controller systems including a selected internal control system having a controller and a communication device configured for data communication with at least one external administrative unit without buffering data to be communicated, said plurality of internal controller systems each controlling a unit of various units of the electronic household appliance;
said communication device configured to transmit device usage data of the electronic household appliance to the at least one external administrative unit without buffering the device usage data; and
said communication device configured to receive a software update from the at least one external administrative unit without buffering the software update; and
said controller of said selected internal control system further configured to control data communication between the at least one external administrative unit and said plurality of internal controller systems of said control system via said communication device.

2. The electronic household appliance according to claim 1, wherein said communication device has a communication module with at least one module interface for data communication with the at least one external administrative unit and a connection interface for data communication with said controller of said selected internal control system.

3. The electronic household appliance according to claim 2, wherein said communication module has said at least one module interface for a wireless communication connection to the at least one external administrative unit.

4. The electronic household appliance according to claim 2, wherein said communication module has said at least one module interface for a direct connection to the at least one external administrative unit.

5. The electronic household appliance according to claim 1, wherein said communication device has at least one control interface for directly connecting said controller of said selected internal control system to the at least one external administrative unit.

6. The electronic household appliance according to claim 1, wherein said controller of said selected internal control system is an operating apparatus having an input and/or a display for a user of the household appliance.

7. The electronic household appliance according to claim 6, wherein said controller of said selected internal control system is configured to control said input and/or said display for exchanging information relating to data communication via said communication device.

8. The electronic household appliance according to claim 1, wherein said unit controlled by said controller of said selected internal control system is selected from the group consisting of: a pump, a heating system, a cooling apparatus, a fan, an input operated by a user, an output for a user, and a central controller of the electric household appliance.

9. The electronic household appliance according to claim 1, wherein said unit controlled by said controller of said selected internal control system is selected from the group consisting of: a pump, a heating system, a cooling apparatus, a fan, a display having an input function and an output function, and a central controller of the electric household appliance.

10. The electronic household appliance according to claim 1, wherein said unit controlled by said controller of said selected internal control system is selected from the group consisting of: a pump, a heating system, a cooling apparatus, a fan, an input operated by a user, and an output for a user.

11. The electronic household appliance according to claim 1, wherein said unit controlled by said controller of said selected internal control system is selected from the group consisting of: a pump, a heating system, a cooling apparatus, a fan, and a display having an input function and an output function.

* * * * *